(12) United States Patent
Katase et al.

(10) Patent No.: US 10,184,046 B2
(45) Date of Patent: Jan. 22, 2019

(54) METHOD OF PRODUCING STANNOUS OXIDE, STANNOUS OXIDE, METHOD OF SN PLATING SOLUTION, AND METHOD OF REMOVING IMPURITIES FROM SN PLATING SOLUTION

(71) Applicant: MITSUBISHI MATERIALS CORPORATION, Tokyo (JP)

(72) Inventors: Takuma Katase, Sanda (JP); Hirotaka Hirano, Sanda (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 221 days.

(21) Appl. No.: 15/119,215

(22) PCT Filed: Mar. 2, 2015

(86) PCT No.: PCT/JP2015/056057
§ 371 (c)(1),
(2) Date: Aug. 16, 2016

(87) PCT Pub. No.: WO2015/133426
PCT Pub. Date: Sep. 11, 2015

(65) Prior Publication Data
US 2017/0009078 A1    Jan. 12, 2017

(30) Foreign Application Priority Data

Mar. 6, 2014  (JP) .................................. 2014-044174
Feb. 19, 2015 (JP) .................................. 2015-030553

(51) Int. Cl.
C09D 1/00    (2006.01)
C01G 19/02   (2006.01)
(Continued)

(52) U.S. Cl.
CPC ............... C09D 1/00 (2013.01); C01G 19/02 (2013.01); C23C 18/1617 (2013.01);
(Continued)

(58) Field of Classification Search
CPC ...... C09D 1/00; C01G 19/02; C23C 18/1617; C23C 18/1692; C23C 18/31
(Continued)

(56) References Cited

U.S. PATENT DOCUMENTS 4,576,921 A * 3/1986 Lane ..................... C01G 19/02
                                              423/338
4,775,412 A * 10/1988 Nishikura ............. C01G 19/02
                                              423/618
(Continued)

FOREIGN PATENT DOCUMENTS

CN    1096332 A    12/1994
CN    103415473 A  11/2013
(Continued)

OTHER PUBLICATIONS

English translation of JP 2012/218955, Nov. 2012; 12 pages.*
(Continued)

*Primary Examiner* — Helene Klemanski
(74) *Attorney, Agent, or Firm* — Locke Lord LLP

(57) ABSTRACT

The method of producing stannous oxide includes: a Sn ion-containing acid solution forming step (S01); a first neutralizing step (S02), which is a step of forming Sn precipitates by adding one or more of alkaline solutions of ammonium carbonate, ammonium bicarbonate, and aqueous ammonia to the Sn ion-containing acid solution to retain pH at 3-6 therein; a Sn precipitate separating step (S03); a Sn precipitate dispersing step (S04), which is a step of dispersing the separated Sn precipitates in a solvent liquid to obtain a dispersion liquid; and a second neutralizing step (S06),
(Continued)

which is a step of forming SnO by adding an alkaline solution to the dispersion liquid of the Sn precipitates and then by heating, wherein Na, K, Pb, Fe, Ni, Cu, Zn, Al, Mg, Ca, Cr, Mn, Co, In, and Cd reside in the Sn ion-containing acid solution in the first neutralizing step (S02).

4 Claims, 2 Drawing Sheets

(51) Int. Cl.
    *C23C 18/16*     (2006.01)
    *C23C 18/31*     (2006.01)
    *C25D 21/18*     (2006.01)

(52) U.S. Cl.
    CPC .......... *C23C 18/1692* (2013.01); *C23C 18/31* (2013.01); *C25D 21/18* (2013.01); *C01P 2006/80* (2013.01)

(58) Field of Classification Search
    USPC ....................................................... 106/1.25
    See application file for complete search history.

(56) References Cited

U.S. PATENT DOCUMENTS

| | | | | |
|---|---|---|---|---|
| 5,246,623 | A * | 9/1993 | Giersberg | C01G 19/02 106/401 |
| 5,451,323 | A | 9/1995 | Akao et al. | |
| 8,501,293 | B2 * | 8/2013 | Grandbois | C01G 19/02 428/35.8 |
| 9,067,800 | B2 * | 6/2015 | Katase | C01G 19/02 |
| 9,108,861 | B2 * | 8/2015 | Katase | C01G 19/02 |
| 2012/0164341 | A1 * | 6/2012 | Hakiri | C23C 18/1617 106/1.22 |
| 2012/0164342 | A1 * | 6/2012 | Hakiri | C23C 18/31 106/1.22 |
| 2012/0195822 | A1 * | 8/2012 | Werner | C01G 19/02 423/618 |
| 2013/0084240 | A1 * | 4/2013 | Grandbois | C01G 19/02 423/618 |
| 2013/0084414 | A1 * | 4/2013 | Grandbois | C01G 19/02 428/35.8 |

FOREIGN PATENT DOCUMENTS

| | | |
|---|---|---|
| EP | 2578535 A2 | 4/2013 |
| EP | 3260420 A1 * | 12/2017 |
| JP | 02-228487 A | 9/1990 |
| JP | 07-3500 A | 1/1995 |
| JP | 2007-302496 A | 11/2007 |
| JP | 2012-140649 A | 7/2012 |
| JP | 2012-140650 A | 7/2012 |
| JP | 2012-218955 A | 11/2012 |
| JP | 2013-060638 A | 4/2013 |
| TW | 201247543 A | 12/2012 |
| TW | 201323336 A | 6/2013 |
| WO | 2012/153715 A1 | 11/2012 |
| WO | 2016/133017 A1 | 8/2016 |

OTHER PUBLICATIONS

English translation of JPH 02/228487, Sep. 1990; 5 pages.*
English translation of JP 2007/302496, Nov. 2007; 13 pages.*
Office Action dated Nov. 4, 2016, issued for the Chinese patent application No. 201580003059.9 and a partial English translation of Search Report.
Office Action dated May 2, 2017, issued for the European patent application No. 15758801.3.
International Search Report dated May 12, 2015, issued for PCT/JP2015/056057 and English translation thereof.
Office Action dated Apr. 19, 2018, issued for the Taiwanese patent application No. 104106824 and English translation thereof.

* cited by examiner

METHOD OF PRODUCING STANNOUS OXIDE, STANNOUS OXIDE, METHOD OF SN PLATING SOLUTION, AND METHOD OF REMOVING IMPURITIES FROM SN PLATING SOLUTION

TECHNICAL FIELD

The present invention relates to a method of producing stannous oxide used as Sn raw materials in soldering, plating, or the like, stannous oxide, a method of Sn plating solution used in forming Sn plating, and a method of removing impurities from the Sn plating solution.

Priority is claimed on Japanese Patent Application No. 2014-044174 filed on Mar. 6, 2014 and Japanese Patent Application No. 2015-030553 file on Feb. 19, 2015, the contents of which are incorporated herein by reference.

BACKGROUND ART

Sn is widely used as plating materials for forming plating films on the surface of metal materials. For example, plated copper materials, in which Sn plating or solder plating is plated on the surface of the copper substrate made of copper or copper alloy, are widely provided as materials for electric components such as lead frame, connector, and the like. In addition, such plated copper materials are used for the semiconductor equipment.

In addition, the Tin materials, in which Sn plating is formed on the steel plate, are used in a variety of applications conventionally.

In Sn plating, there is a problem that characteristics of the plating film change occasionally due to precipitation of impurities in the Sn plating solution with Sn. In addition, the presence of the impurities in the Sn plating solution has a substantial impact on platability. Thus, Sn plating solution with reduced level of impurities is demanded.

In addition, since impurities in the Sn plating solution are accumulated while in use, there is an occasion that platability deteriorates with the passage of time. Thus, efficient removal of the impurities from the used Sn plating solution is required.

Methods of removing Cu as an impurity from non-electrolytic Sn plating solutions are proposed in patent literatures 1-3 (PTLs 1 to 3).

CITATION LIST

Patent Literature

PTL 1: Japanese Unexamined Patent Application, First Publication No. 2012-140649 (A)
PTL 2: Japanese Unexamined Patent Application, First Publication No. 2012-140650 (A)
PTL 3: Japanese Unexamined Patent Application, First Publication No. 2013-060638 (A)

SUMMARY OF INVENTION

Technical Problem

Although methods for reducing Cu are disclosed in the methods described in PTLs 1 to 3, removal of other elements, such as Na, K, Pb, Fe, Ni, Zn, Al, Mg, Ca, Cr, Mn, Co, in, and Cd, was not taken into consideration.

The present invention is made under the circumstances described above. The purpose of the present invention is to provide a method of producing stannous oxide capable of effectively removing elements such as Na, K, Pb, Fe, Ni, Zn, Al, Mg, Ca, Cr, Mn, Co, In, and Cd; stannous oxide, a method of Sn plating solution; and a method of removing impurities from the Sn plating solution

Solution to Problem

An aspect of the present invention is a method of producing stannous oxide including: a Sn ion-containing acid solution forming step, which is a step of preparing a Sn ion-containing acid solution by adding Sn ions to an acid solution; a first neutralizing step, which is a step of forming Sn precipitates by adding one or more of alkaline solutions of ammonium carbonate, ammonium bicarbonate, and aqueous ammonia to the Sn ion-containing acid solution to retain pH at 3-6 therein; a Sn precipitate separating step, which is a step of separating the Sn precipitates from the Sn ion-containing acid solution; a Sn precipitate dispersing step, which is a step of dispersing the separated Sn precipitates in a solvent liquid to obtain a dispersion liquid; and a second neutralizing step, which is a step of forming SnO from the Sn precipitates by adding an alkaline solution to the dispersion liquid of the Sn precipitates and then by heating, wherein Na, K, Pb, Fe, Ni, Cu, Zn, Al, Mg, Ca, Cr, Mn, Co, In, and Cd reside in the Sn ion-containing acid solution in the first neutralizing step.

In the method of producing stannous oxide of the aspect of the present invention configured as described above, content amounts of Na, K, Pb, Fe, Ni, Cu, Zn, Al, Mg, Ca, Cr, Mn, Co, In, and Cd in the Sn precipitates can be reduced, since the method includes the first neutralizing step of forming the Sn precipitates by adding one or more of alkaline solutions of ammonium carbonate, ammonium bicarbonate, and aqueous ammonia to the Sn ion-containing acid solution to retain pH at 3-6 therein.

Then, the stannous oxide with reduced content amounts of Na, K, Pb, Fe, Ni, Cu, Zn, Al, Mg, Ca, Cr, Mn, Co, In, and Cd can be obtained, since the method includes: the Sn precipitate separating step, which is a step of separating the Sn precipitates from the Sn ion-containing acid solution; the Sn precipitate dispersing step, which is a step of dispersing the separated Sn precipitates in a solvent liquid to obtain a dispersion liquid; and the second neutralizing step, which is a step of forming SnO from the Sn precipitates by adding an alkaline solution to the dispersion liquid of the Sn precipitates and then by heating The method of producing stannous oxide, which is an aspect of the present invention, may further include an acid adding step, which is a step of adding hydrochloric acid or citric acid to the dispersion liquid of the Sn precipitates between the Sn precipitate dispersing step and the second neutralizing step.

In this case, by adding hydrochloric acid or citric acid in the acid adding step, even if acid components originated before the first neutralizing step S02 were included in the Sn precipitates, these acid components could be removed. Thus, SnO (stannous oxide) can be formed efficiently in the second neutralizing step thereafter.

The other aspect of the present invention is stannous oxide wherein each of content amounts of Na, K, Pb, Fe, Ni, Cu, Zn, Al, Mg, Ca, Cr, Mn, Co, In, and Cd is 1 ppm or less in a weight ratio.

In the stannous oxide, which is other aspect of the present invention, as configured described above, each of the content amounts of Na, K, Pb, Fe, Ni, Cu, Zn, Al, Mg, Ca, Cr, Mn, Co, In, and Cd is reduced to the level of 1 ppm or less by a weight ratio. Thus, the stannous oxide can be used in a variety of applications as a high-grade stannous oxide.

It is preferable that the total content amounts of Na, K, Pb, Fe, Ni, Cu, Zn, Al, Mg, Ca, Cr, Mn, Co, In, and Cd is less than 15 ppm in a weight ratio. More preferably, the total content amounts of Na, K, Pb, Fe, Ni, Cu, Zn, Al, Mg, Ca, Cr, Mn, Co, In, and Cd is less than 7.5 ppm.

The other aspect of the present invention is a method of producing a Sn plating solution used in Sn plating comprising a step of producing the Sn plating solution by dissolving the stannous oxide prepared in the method of producing stannous oxide according to the above-described method of producing stannous oxide, which is an aspect of the present invention, in an acid solution.

In the method of producing a Sn plating solution, which is other aspect of the present invention, configured as described above, the content amounts of Na, K, Pb, Fe, Ni, Cu, Zn, Al, Mg, Ca, Cr, Mn, Co, In, and Cd in the Sn plating solution are reduced since the stannous oxide that is obtained by the above-described method of producing stannous oxide is used. Thus, platability can be improved.

Other aspect of the present invention is a method of producing a Sn plating solution used in Sn plating including: a Sn ion-containing acid solution forming step, which is a step of preparing a Sn ion-containing acid solution by adding Sn ions to an acid solution; a first neutralizing step, which is a step of forming Sn precipitates by adding one or more of alkaline solutions of ammonium carbonate, ammonium bicarbonate, and aqueous ammonia to the Sn ion-containing acid solution to retain pH at 3-6 therein; a Sn precipitate separating step, which is a step of separating the Sn precipitates from the Sn ion-containing acid solution; and a Sn precipitate dissolving step, which is a step of dissolving the separated Sn precipitates in an acid solution, wherein Na, K, Pb, Fe, Ni, Cu, Zn, Al, Mg, Ca, Cr, Mn, Co, In, and Cd reside in the Sn ion-containing acid solution in the first neutralizing step.

The method of producing a Sn plating solution, which is other aspect of the present invention, as configured described above, includes the first neutralizing step that is the step of forming Sn precipitates by adding one or more of alkaline solutions of ammonium carbonate, ammonium bicarbonate, and aqueous ammonia to the Sn ion-containing acid solution to retain pH at 3-6 therein. Thus, each of content amounts of Na, K, Pb, Fe, Ni, Cu, Zn, Al, Mg, Ca, Cr, Mn, Co, In, and Cd in the Sn precipitates is reduced.

Then, the Sn plating solution with reduced content amounts of Na, K, Pb, Fe, Ni, Cu, Zn, Al, Mg, Ca, Cr, Mn, Co, In, and Cd can be obtained since the method includes: the Sn precipitate separating step, which is the step of separating the Sn precipitates from the Sn ion-containing acid solution; and the Sn precipitate dissolving step, which is the step of dissolving the separated Sn precipitates in the acid solution.

Other aspect of the present invention is a method of removing impurities from an Sn plating solution, in which Sn ions present in an acid solution, the method of removing impurities including; a first neutralizing step, which is a step of forming Sn precipitates by adding one or more of alkaline solutions of ammonium carbonate, ammonium bicarbonate, and aqueous ammonia to the Sn plating solution to retain pH at 3-6 therein; a Sn precipitate separating step, which is a step of separating the Sn precipitates from the Sn plating solution; and a Sn precipitate dissolving step, which is a step of dissolving the separated Sn precipitates in an acid solution, wherein Na, K, Pb, Fe, Ni, Cu, Zn, Al, Mg, Ca, Cr, Mn, Co, In, and Cd reside in the Sn plating solution in the first neutralizing step.

The method of removing impurities from the Sn plating solution, which is other aspect of the present invention, as configured described above, includes the first neutralizing step, which is the step of forming Sn precipitates by adding one or more of alkaline solutions of ammonium carbonate, ammonium bicarbonate, and aqueous ammonia to the Sn plating solution to retain pH at 3-6 therein. Thus, the Sn precipitates can be obtained, while the Na, K, Pb, Fe, Ni, Cu, Zn, Al, Mg, Ca, Cr, Mn, Co, In, and Cd included in the Sn plating solution, in which impurities are accumulated by use, reside in the Sn plating solution.

Then, since the method includes: the Sn precipitate separating step, which is the step of separating the Sn precipitates from the Sn plating solution; and the Sn precipitate dissolving step, which is the step of dissolving the separated Sn precipitates in the acid solution, the Sn plating solution with a reduced content amounts of the Na, K, Pb, Fe, Ni, Cu, Zn, Al, Mg, Ca, Cr Mn, Co, In, and Cd can be obtained.

Advantageous Effects of Invention

According to aspects of the present invention, the method of producing stannous oxide capable of effectively removing elements such as Na, K, Pb, Fe, Ni, Cu, Zn, Al, Mg, Ca, Cr, Mn, Co, In, and Cd; the stannous oxide; the method of producing the Sn plating solution; and the method of removing impurities from the Sn plating solution can be provided.

DESCRIPTION OF EMBODIMENTS

Figure 1:
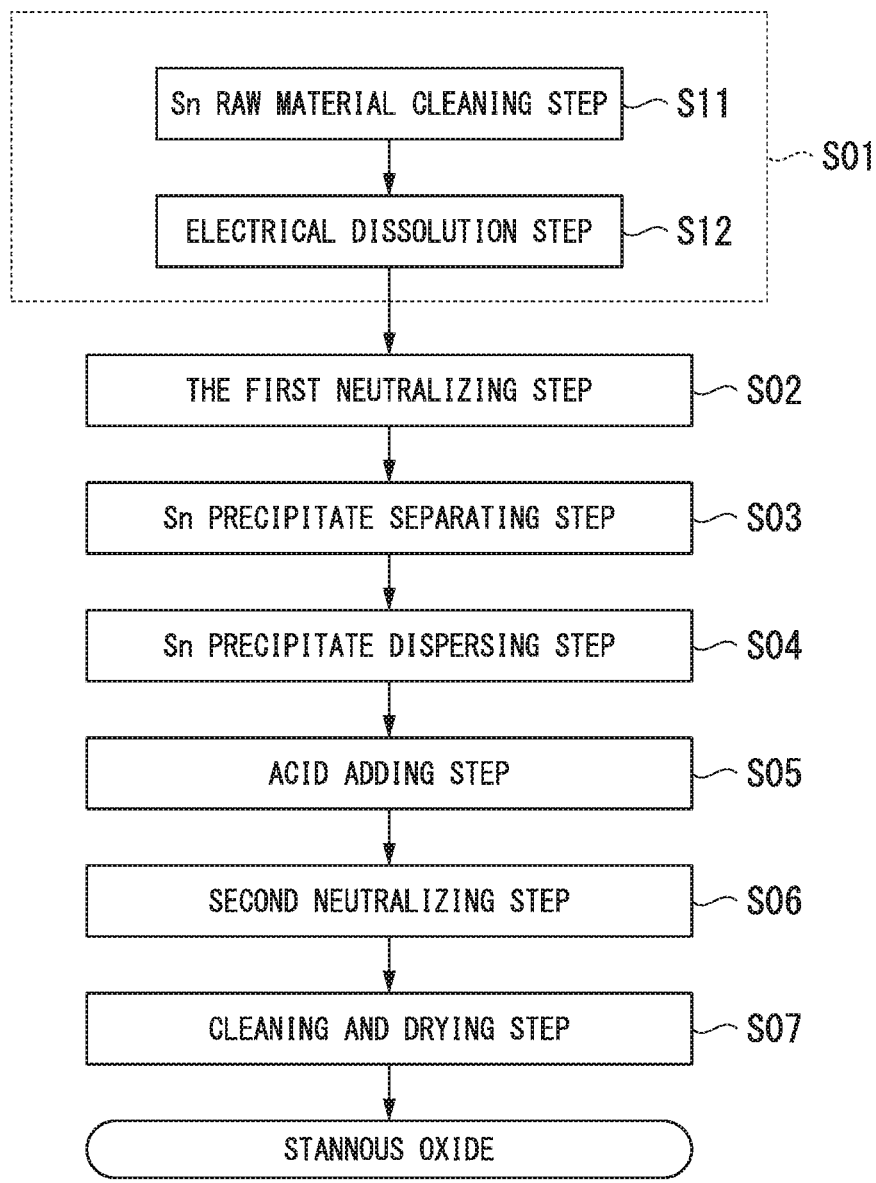
FIG. 1 is a flow diagram showing the method of producing stannous oxide, which is the first embodiment of the present invention.

The stannous oxide; the method of producing stannous oxide; the method of producing the Sn plating solution; and the method of removing impurities from a Sn plating solution, which are embodiments of the present invention, are explained below.

[First Embodiment]

First, the method of producing stannous oxide and the stannous oxide, which are the first embodiment of the present invention, are explained. The stannous oxide of the present invention is used for a variety of applications such as materials for soldering or metal Sn; Sn-supplying materials for Sn plating solution; and the like.

In the stannous oxide of the first embodiment of the present embodiment, each of the content amounts of Na, K, Pb, Fe, Ni, Cu, Zn, Al, Mg, Ca, Cr, Mn, Co, In, and Cd is set to 1 ppm or less in a weight ratio.

As described above, the above-described specific impurity elements are reduced in the stannous oxide of the present embodiment (the composition including stannous oxide as the major component). The reason for setting the content amounts of impurity elements as described above in the stannous oxide of the present invention is explained below.

[Pb: 1 ppm or Less]

Pb has very similar characteristics to Sn, and an element hard to separate from Sn. Therefore, in the case where stannous oxide is used as Sn-supplying materials of the Sn plating solution, Pb is accumulated in the Sn plating solution as an impurity element, and deteriorates platability.

Thus, the content amount of Pb in the stannous oxide is set to 1 ppm or less in a weight ratio in the present embodiment.

[Na and K: 1 ppm or Less Each]

Elements such as Na and K are likely to be mixed into in stannous oxide during purification of Sn raw materials. In the case where stannous oxide is used as Sn-supplying materials of the Sn plating solution, they are accumulated in the Sn plating solution as impurity elements, and deteriorate platability occasionally.

Thus, each of the content amounts of Na and K in the stannous oxide is set to 1 ppm or less in a weight ratio in the present embodiment.

[Fe, Ni, Cu, and Zn: 1 ppm or Less Each]

Elements such as Fe, Ni, Cu, and Zn are mixed into the Sn plating solution from the object to be plated, the base plating, or the like. They are accumulated in the Sn plating solution as impurity elements, and deteriorate platability occasionally.

Thus, each of the content amounts of Fe, Ni, Cu and Zn in the stannous oxide is set to 1 ppm or less in a weight ratio in the present embodiment.

[Al, Mg, Ca, Cr, Mn, Co, In, and Cd: 1 ppm or Less Each]

Elements such as Al, Mg, Ca, Cr, Mn, Co, In, and Cd are mixed in the Sn raw materials occasionally. In the case where stannous oxide is used as Sn-supplying materials of the Sn plating solution, they are accumulated in the Sn plating solution as impurity elements, and deteriorate platability occasionally.

Thus, each of the content amounts of Al, Mg, Ca, Cr, Mn, Co, In, and Cd in the stannous oxide is set to 1 ppm or less in a weight ratio in the present embodiment.

It is preferable that the total content amount of the above-described Na, K, Pb, Fe, Ni, Cu, Zn, Al, Mg, Ca, Cr, Mn, Co, In, and Cd is set to be less than 15 ppm in a weight ratio in order to suppress deterioration of the Sn plating solution reliably. More preferably, it is set to be less than 7.5 ppm in a weight ratio.

Next, the method of producing stannous oxide of the present embodiment is explained in reference to the flow diagram shown in FIG. 1.

[Sn Ion-Containing Acid Solution Preparing Step S01]

First, the Sn ion-containing acid solution is prepared by adding Sn ions to an acid solution. In this embodiment, highly pure metal Sn (purity: higher than 99.99 mass %) is prepared and the surface of the metal Sn is cleaned by an acid detergent (Sn raw material cleaning step S11). In this step, the metal Sn is cleaned until the luster comes out on the surface of the metal Sn by removing oil and oxides on the surface of the metal Sn.

Next, the cleaned metal Sn is electrically dissolved in an acid solution to prepare the Sn ion-containing acid solution (Electrical dissolution step S12). The acid solution used in this step is not particularly limited, and methane sulfonic acid; hydrochloric acid; nitric acid; sulfuric acid; boric hydrofluoric acid; phenol sulfonic acid; alkanol sulfonic acid; alkyl sulfonic acid; or the like, or a mixed acid thereof can be used. In addition, it is preferable that the Sn concentration is set to the range of 50 g/L or more and 150 g/L or less, for example. In the present embodiment, the Sn concentration is set in the range of 100 g/L to 110 g/L.

[First Neutralizing Step S02]

Next, the Sn precipitates (Tin hydroxide or the like) are obtained as the insoluble fraction by adding one or more of alkaline solutions of ammonium carbonate, ammonium bicarbonate, and aqueous ammonia to the Sn ion-containing acid solution to retain pH at 3-6 therein. In this step, element such as Na, K, Pb, Fe, Ni, Cu, Zn, Al, Mg, Ca, Cr, Mn, Co, In, and Cd reside in the Sn ion-containing acid solution, which is the soluble fraction, while Sn is recovered as the Sn precipitates (Tin hydroxide or the like). Residing in the Sn ion-containing acid solution means 99.0% or more of the elements reside in the soluble fraction (Sn ion-containing acid solution) after completion of the first neutralizing step S02 in the case where 100% is defined as the total elemental mass of Na, K, Pb, Fe, Ni, Cu, Zn, Al, Mg, Ca, Cr, Mn, Co, In, and Cd included in the acid solution prepared in the Sn ion-containing acid solution preparing step S01.

In the present embodiment, ammonium bicarbonate solution is added until pH becomes a value in the range of 3.5 to 4.

[Sn precipitate separating step S03]

Next, the Sn precipitates (Tin hydroxide or the like) are separated from the Sn ion-containing acid solution.

[Sn Precipitate Dispersing Step S04]

Next, the Sn precipitates (Tin hydroxide or the like) are cleaned by repeating dispersion of the separated Sn precipitates (Tin hydroxide or the like) in pure water; and filtration 2 to 3 times. Because of this, impurities attached to the surface of the cleaned Sn precipitates (Tin hydroxide or the like) are removed. Then, the finally cleaned Sn precipitates (Tin hydroxide or the like) are dispersed in pure water.

[Acid Adding Step S05]

Next, if it is needed, hydrochloric acid or citric acid is added to the dispersion liquid, in which the Sn precipitates (Tin hydroxide or the like) are dispersed. Acid components are separated from the Sn precipitates (Tin hydroxide or the like) in this acid adding step S05.

[Second Neutralizing Step S06]

Next, SnO (stannous oxide) is formed from the Sn precipitates (Tin hydroxide or the like) by adding an alkaline solution to the dispersion liquid, in which the Sn precipitates (Tin hydroxide or the like) are dispersed, and then by heating. In this second neutralizing step S06, SnO (stannous oxide) is formed by dehydrating the Sn precipitates (Tin hydroxide or the like). In the present embodiment, the ammonium bicarbonate solution is added as the alkaline solution until pH becomes 6 or more; and the mixture is heated to 100° C. or more.

[Cleaning and Drying Step S07]

Next, the obtained SnO (stannous oxide) is cleaned by repeating dispersion of the obtained SnO (stannous oxide) in pure water and filtration 2 to 3 times. Because of this, impurities attached to the surface of the SnO (stannous oxide) are removed. Then the finally cleaned SnO (stannous oxide) is filtered and dried.

By following the above-described steps, the stannous oxide of the present embodiment is produced.

According to the stannous oxide of the present embodiment as configured above, each of content amount of Na, K, Pb, Fe, Ni, Cu, Zn, Al, Mg, Ca, Cr, Mn, Co, In, and Cd is set to 1 ppm or less in a weight ratio. Thus, even if these elements are mixed in during the production process, impurity elements in the stannous oxide are reduced sufficiently; and the stannous oxide can be used for a variety of applications.

In addition, even if this stannous oxide is used as the Sn supplying materials of the Sn plating solution, deterioration of platability of the Sn plating solution can be suppressed; and a high quality plating film can be formed efficiently.

In addition, the Sn plating solution can be produced by dissolving the stannous oxide of the present embodiment in an acid solution such as methanesulfonic acid, sulfuric acid aqueous solution, and the like. The content amounts of Na, K, Pb, Fe, Ni, Cu, Zn, Al, Mg, Ca, Cr, Mn, Co, In, and Cd in this Sn plating solution are extremely low. Thus, platability of the Sn plating solution is improved; and a high quality plating film can be formed efficiently.

According to the method of producing stannous oxide of the present embodiment, content amounts of Na, K, Pb, Fe, Ni, Cu, Zn, Al, Mg, Ca, Cr, Mn, Co, In, and Cd in the Sn precipitates (Tin hydroxide or the like) can be reduced, since the method includes the first neutralizing step S02, which is the step of forming Sn precipitates (Tin hydroxide or the like) by adding an alkaline solution (ammonium bicarbonate in this embodiment) to the Sn ion-containing acid solution to retain pH at 3-6 therein.

Moreover, since the method further includes: the Sn precipitate separating step S03, which is the step of separating the Sn precipitates (Tin hydroxide or the like) from the Sn ion-containing acid solution; the precipitate dispersing step S04, which is the step of dispersing the separated Sn precipitates (Tin hydroxide or the like) in a solvent liquid such as pure water to obtain a dispersion liquid; and the second neutralizing step S06, which is the step of forming SnO (stannous oxide) from the Sn precipitates (Tin hydroxide or the like) by adding an alkaline solution to the dispersion liquid of the Sn precipitates (Tin hydroxide or the like) and then by heating, the stannous oxide with reduced content amounts of Na, K, Pb, Fe, Ni, Cu, Zn, Al, Mg, Ca, Cr Mn, Co, In, and Cd can be obtained efficiently.

In addition, the method of producing stannous oxide of the present embodiment further includes the acid adding step S05, which is the step of adding hydrochloric acid or citric acid to the dispersion liquid of the Sn precipitates (Tin hydroxide or the like) between the Sn precipitate dispersing step S04 and the second neutralizing step S06. Thus, even if acid components originated before the first neutralizing step S02 were included in the Sn precipitates (Tin hydroxide or the like), these acid components can be removed; and SnO (stannous oxide) can be formed efficiently in the second neutralizing step S06 thereafter. Specifically, SnO (stannous oxide) can be produced efficiently without strictly controlling the pH value and the heating temperature in the second neutralizing step S06.

[Second Embodiment]

Figure 2:
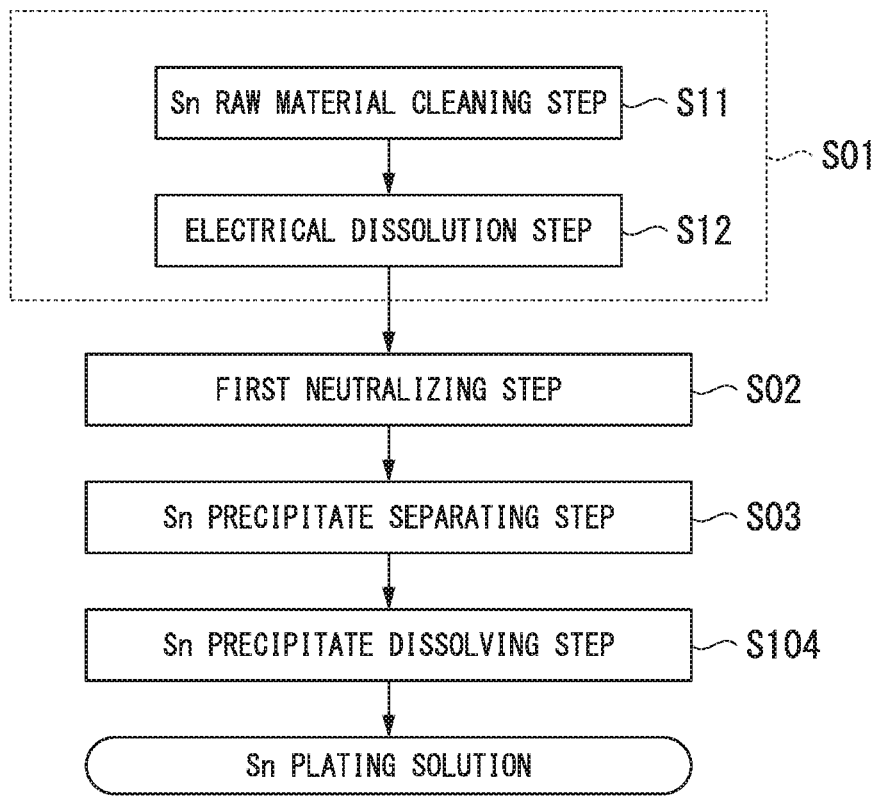
FIG. 2 is a flow diagram showing the method of producing a Sn plating solution, which is the second embodiment of the present invention.

Next, the method of producing the Sn plating solution, which is the second embodiment of the present invention, is explained in reference to the flow diagram shown in FIG. 2. In terms of the same configurations as in the first embodiment, the same reference numerals are placed and detailed explanations are omitted.

[Sn Ion-Containing Acid Solution Forming Step S01]

First, the Sn ion-containing acid solution is formed by adding Sn ions to an acid solution as in the first embodiment. In this Sn ion-containing acid solution forming step S01, the Sn ion-containing acid solution is formed by performing the Sn raw materials cleaning step S11 and the electrical dissolution step S12.

[First Neutralizing Step S02]

Next, the Sn precipitates (Tin hydroxide or the like) are obtained by adding one or more of alkaline solutions of ammonium carbonate, ammonium bicarbonate, and aqueous ammonia to the Sn ion-containing acid solution to retain pH at 3-6 therein. In this step, element such as Na, K, Pb, Fe, Ni, Cu, Zn, Al, Mg, Ca, Cr, Mn, Co, In, and Cd reside in the Sn ion-containing acid solution, while Sn is recovered as the Sn precipitates (Tin hydroxide or the like).

[Sn Precipitate Separating Step S03]

Next, the Sn precipitates (Tin hydroxide or the like) are separated from the Sn ion-containing acid solution.

[Sn Precipitate Dissolving Step S04]

Next, the Sn precipitates (Tin hydroxide or the like) are cleaned by repeating dispersion of the separated Sn precipitates (Tin hydroxide or the like) in pure water; and filtration 2 to 3 times. Because of this, impurities attached to the surface of the cleaned Sn precipitates (Tin hydroxide or the like) are removed. Then, the finally cleaned Sn precipitates (Tin hydroxide or the like) are dissolved in the acid solution used as the Sn plating solution.

By following the above-described process, the Sn plating solution can be formed.

According to the method of producing the Sn plating solution of the present embodiment, content amounts of Na, K, Pb, Fe, Ni, Cu, Zn, Al, Mg, Ca, Cr, Mn, Co, In, and Cd in the Sn precipitates (Tin hydroxide or the like) can be reduced, since the method includes the first neutralizing step S02, which is the step of forming Sn precipitates by adding one or more of alkaline solutions of ammonium carbonate, ammonium bicarbonate, and aqueous ammonia to the Sn ion-containing acid solution to retain pH at 3-6 therein.

Moreover, since the method further includes: the Sn precipitate separating step S03, which is the step of separating the Sn precipitates from the Sn ion-containing acid solution; and the Sn precipitate dissolving step S104, which is the step of dissolving the separated Sn precipitates in the acid solution, the Sn plating solution with reduced content amounts of Na, K, Pb, Fe, Ni, Cu, Zn, Al, Mg, Ca, Cr, Mn, Co, In, and Cd can be obtained efficiently.

[Third Embodiment]

Figure 3:
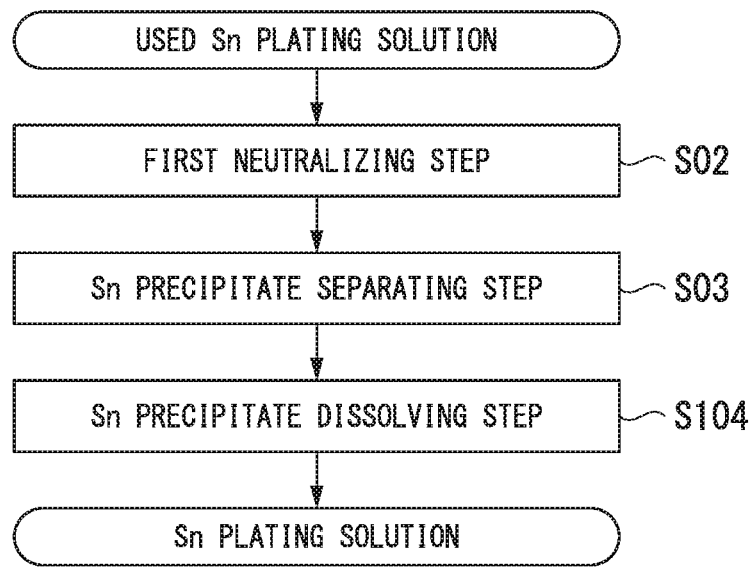
FIG. 3 is a flow diagram showing the method of removing impurities from a Sn plating solution, which is the third embodiment of the present invention.

Next, the method of removing impurities from the Sn plating solution, which is the third embodiment of the present invention, is explained in reference to the flow diagram shown in FIG. 3. In terms of the same configurations as in the first and second embodiments, the same reference numerals are placed and detailed explanations are omitted.

In the used Sn plating solution, impurity elements included in Sn supplying materials and/or impurity elements mixed from the object to be plated or the based plating are accumulated. This accumulation of impurity elements in the used Sn plating solution deteriorates platability.

The method of removing impurities from the Sn plating solution of the present embodiment is for efficiently removing the impurity elements from the used Sn plating solution.

[First Neutralizing Step S02]

First, the Sn precipitates (Tin hydroxide or the like) are obtained by adding one or more of alkaline solutions of ammonium carbonate, ammonium bicarbonate, and aqueous ammonia to the used Sn plating solution to retain pH at 3-6 therein. In this step, element such as Na, K, Pb, Fe, Ni, Cu, Zn, Al, Mg, Ca, Cr, Mn, Co, In, and Cd reside in the Sn plating solution, while Sn is recovered as the Sn precipitates (Tin hydroxide or the like).

[Sn Precipitate Separating Step S03]

Next, the Sn precipitates (Tin hydroxide or the like) are separated from the Sn ion-containing acid solution.

[Sn Precipitate Dissolving Step S104]

Next, the Sn precipitates (Tin hydroxide or the like) are cleaned by repeating dispersion of the separated Sn precipitates (Tin hydroxide or the like) in pure water; and filtration 2 to 3 times. Because of this, impurities attached to the surface of the cleaned Sn precipitates (Tin hydroxide or the like) are removed. Then, the finally cleaned Sn precipitates (Tin hydroxide or the like) are dissolved in the acid solution used as the Sn plating solution.

By following the above-described process, the Sn plating solution can be formed.

According to the method of removing impurities from the Sn plating solution of the present embodiment, the Sn precipitates can be obtained while Na, K, Pb, Fe, Ni, Cu, Zn, Al, Mg, Ca, Cr, Mn, Co, In, and Cd in the Sn plating solution, in which the impurity elements are accumulated by use, reside in the Sn plating solution, since the method includes the first neutralizing step S02, which is the step of forming Sn precipitates by adding one or more of alkaline solutions of ammonium carbonate, ammonium bicarbonate, and aqueous ammonia to the Sn plating solution to retain pH at 3-6 therein. Moreover, since the method further includes: the Sn precipitate separating step S03, which is the step of separating the Sn precipitates from the Sn plating solution; and the Sn precipitate dissolving step S 104, which is the step of dissolving the separated Sn precipitates in the acid solution, the Sn plating solution with reduced content amounts of Na, K, Pb, Fe, Ni, Cu, Zn, Al, Mg, Ca, Cr, Mn, Co, In, and Cd can be obtained efficiently.

Embodiments of the present invention are explained above. However, the present invention is not particularly limited by the descriptions of the embodiments, and can be modified as needed in the range that does not depart from the technical concept of the present invention as defined in the scope of the present invention.

For example, it is explained that the metal Sn is electrically dissolved in the Sn ion-containing acid solution forming step S01 in the present invention. However, the present invention is not limited by the description, and a Sn ion-containing acid solution prepared by other method can be used. In addition, it is explained that the acid adding step S05, which is the step of adding hydrochloric acid or citric acid, is performed between the Sn precipitate dispersing step S04 and the second neutralizing step S06 in the first embodiment of the present embodiment. However, the present invention is not particularly limited by the description, and the acid adding step S05 can be omitted in the case where hydrochloric acid or citric acid is included in the mixture at the beginning.

EXAMPLE

Results of confirmatory experiments performed to confirm effectiveness of the present invention are explained below.

In Examples 1-4 (Ex. 1-4) of the present invention, neutralization was performed until the pH values shown in Table 1 were obtained by adding ammonium bicarbonate to the hydrochloric acid aqueous solution of tin. The Sn precipitates were obtained by cleaning the obtained cake. Then, the Sn precipitates were dispersed in pure water again. Next, neutralization was performed by adding ammonium bicarbonate to the dispersion liquid of the Sn precipitates until the pH value became 8, and then, the neutralized mixture was heated as the second neutralizing step. By cleaning and drying the obtained cake, stannous oxide was prepared.

In Example 5 (Ex. 5) of the present invention, neutralization was performed until the pH value shown in Table 1 was obtained by adding ammonium carbonate to the hydrochloric acid aqueous solution of tin. The Sn precipitates were obtained by cleaning the obtained cake. Then, the Sn precipitates were dispersed in pure water again. Next, neutralization was performed by adding ammonium carbonate to the dispersion liquid of the Sn precipitates until the pH value became 8, and then, the neutralized mixture was heated as the second neutralizing step. By cleaning and drying the obtained cake, stannous oxide was prepared.

In Comparative Example (C. Ex.), neutralization was performed until the pH value became 8 by adding sodium hydrogen carbonate to the hydrochloric acid aqueous solution of tin while the mixture was heated as the neutralizing step. By cleaning and drying the obtained cake, the stannous oxide powder was prepared. This means that stannous oxide was prepared by a single round of neutralizing step in Comparative Example.

In terms of the stannous oxide preparations obtained as explained above, concentrations (in a weight ratio) of Na, K, Pb, Fe, Ni, Cu, Zn, Al, Mg, Ca, Cr, Mn, Co, In, and Cd, each of which is an impurity element, were measured by using ICP-MS. Measurement results are shown in Table 1.

TABLE 1

| | pH value in the first neutralizing step | Concentration of impurities (ppm) | | | | | | | | | | | | | |
|---|---|---|---|---|---|---|---|---|---|---|---|---|---|---|---|
| | | Na | K | Pb | Fe | Ni | Cu | Zn | Al | Mg | Ca | Cr | Mn | Co | In | Cd |
| Ex. 1 | 3 | <1 | 0.1 | 0.4 | 0.4 | <0.3 | 0.1 | 0.2 | 0.3 | 0.1 | 0.8 | 0.2 | 0.02 | <0.1 | <1 | <1 |
| Ex. 2 | 4 | <1 | 0.1 | 0.4 | 0.30 | <0.3 | 0.10 | 0.20 | 0.20 | 0.10 | 0.50 | 0.30 | 0.03 | <0.1 | <1 | <1 |
| Ex. 3 | 5 | <1 | 0.2 | 0.6 | 0.40 | <0.3 | 0.20 | 0.40 | 0.40 | 0.20 | 0.70 | 0.20 | 0.02 | <0.1 | <1 | <1 |
| Ex. 4 | 6 | <1 | 0.1 | 0.8 | 0.50 | <0.3 | 0.30 | 0.50 | 0.30 | 0.10 | 0.60 | 0.10 | 0.03 | <0.1 | <1 | <1 |
| Ex. 5 | 4 | <1 | 0.1 | 0.5 | 0.40 | <0.3 | 0.20 | 0.30 | 0.20 | 0.30 | 0.30 | 0.40 | 0.02 | <0.1 | <1 | <1 |
| C. Ex. | — | 1000 | 0.4 | 34 | 8 | 4 | 5 | 0.5 | 7 | 29 | 110 | 0.8 | 0.05 | 3 | 3 | <1 |

In Comparative Example, each concentration of the impurity elements was high. Particularly, Na concentration was 1000 ppm in a weight ratio and extremely high.

Contrary to that, in Examples of the present invention, concentrations of the impurity elements were low in each case.

Based on the above-explained experimental results, in accordance with Examples of the present invention, elements such as Na, K, Pb, Fe, Ni, Cu, Zn, Al, Mg, Ca, Cr Mn, Co, In, and Cd were able to be removed effectively. Thus, it was confirmed that high quality stannous oxide with reduced impurity elements could be obtained.

INDUSTRIAL APPLICABILITY

Stannous oxide having a lesser content amount of impurity elements can be obtained; and higher effects can be obtained in the technical field of Sn plating and other technical field utilizing Sn.

REFERENCE SIGNS LIST

S01: Sn ion-containing acid solution forming step
S02: First neutralizing step
S03: Sn precipitate separating step
S04: Sn precipitate dispersing step
S06: Second neutralizing step

What is claimed is:

1. A method of producing stannous oxide comprising:
a Sn ion-containing acid solution forming step, which is a step of preparing a Sn ion-containing acid solution by adding Sn ions to an acid solution;
a first neutralizing step, which is a step of forming Sn precipitates by adding one or more of alkaline solutions of ammonium carbonate, ammonium bicarbonate, and aqueous ammonia to the Sn ion-containing acid solution to retain pH at 3-6 therein;
a Sn precipitate separating step, which is a step of separating the Sn precipitates from the Sn ion-containing acid solution;
a Sn precipitate dispersing step, which is a step of dispersing the separated Sn precipitates in a solvent liquid to obtain a dispersion liquid; and
a second neutralizing step, which is a step of forming SnO from the Sn precipitates by adding an alkaline solution to the dispersion liquid of the Sn precipitates and then by heating, wherein
Na, K, Pb, Fe, Ni, Cu, Zn, Al, Mg, Ca, Cr, Mn, Co, In, and Cd reside in the Sn ion-containing acid solution in the first neutralizing step.

2. The method of producing stannous oxide according to claim 1, further comprising an acid adding step, which is a step of adding hydrochloric acid or citric acid to the dispersion liquid of the Sn precipitates between the Sn precipitate dispersing step and the second neutralizing step.

3. A stannous oxide
wherein each of content amounts of Na, K, Pb, Fe, Ni, Cu, Zn, Al, Mg, Ca, Cr, Mn, Co, In, and Cd is 1 ppm or less in weight ratio and
the total amount of Na, K, Pb, Fe, Ni, Cu, Zn, Al, Mg, Ca, Cr, Mn, Co, In, and Cd is less than 15 ppm in weight ratio.

4. A method of producing a Sn plating solution used in Sn plating comprising a step of producing the Sn plating solution by dissolving the stannous oxide prepared in the method of producing stannous oxide according to claim 1 in an acid solution.

* * * * *